(12) United States Patent
Yue

(10) Patent No.: US 10,300,935 B2
(45) Date of Patent: May 28, 2019

(54) WALKING-TYPE ELECTRIC CARRIER

(71) Applicant: Zhejiang Microlift Electric Technology Co., Ltd., Jiaxing, Zhejiang (CN)

(72) Inventor: Diguo Yue, Zhejiang (CN)

(73) Assignee: Zhejiang Microlift Electric Technology Co., Ltd. (CN)

( * ) Notice: Subject to any disclaimer, the term of this patent is extended or adjusted under 35 U.S.C. 154(b) by 112 days.

(21) Appl. No.: 15/719,468

(22) Filed: Sep. 28, 2017

(65) Prior Publication Data
US 2019/0054946 A1    Feb. 21, 2019

(30) Foreign Application Priority Data
Aug. 21, 2017    (CN) .......................... 2017 1 0718306

(51) Int. Cl.
*B62B 5/00* (2006.01)
*B62B 5/04* (2006.01)
*B62B 5/06* (2006.01)

(52) U.S. Cl.
CPC .......... *B62B 5/0043* (2013.01); *B62B 5/0053* (2013.01); *B62B 5/0404* (2013.01); *B62B 5/063* (2013.01)

(58) Field of Classification Search
CPC ........................... B62B 5/0033; B62B 5/0043
See application file for complete search history.

(56) References Cited

U.S. PATENT DOCUMENTS 10,093,336 B2 * 10/2018 Pan ........................ B62B 5/0043

FOREIGN PATENT DOCUMENTS

CN    106926882 A    *    7/2017

* cited by examiner

*Primary Examiner* — Kevin Hurley

(57) ABSTRACT

A walking-type electric carrier, comprising a handlebar, a driving mechanism, and a carrier frame that is connected to the driving mechanism; the handle bar comprises an armrest cross-bar, a vertical post that is vertically connected to the armrest cross-bar; the vertical post is connected to the driving mechanism; the vertical post is provided with a lifting handle, and the armrest cross-bar is provided with a detachable handle component; the handle component comprises a handle base and a handle body; the handle base and the handle body are detachably connected; the driving mechanism is controlled by the handle body to propel the carrier to move.

10 Claims, 10 Drawing Sheets

WALKING-TYPE ELECTRIC CARRIER

TECHNICAL FIELD OF THE INVENTION

The present invention relates to the technical field of carriers, and more particularly, to a walking-type electric carrier.

BACKGROUND OF THE INVENTION

Modern life requires a more efficient use of space. Consequently, a smaller-sized carrier can provide greater convenience to users, while ensuring strong power. A traditional hand hydraulic carrier is mainly used to handle cargo pallets or directly handle cargos, which can be conveniently operated and flexibly moved. However, such a traditional hand carrier can merely be manually moved or pulled, which is labor-consuming and inefficient, especially when the ground is uneven.

Although traditional full-electric carriers sold on the market are time-saving and labor-saving, they are cumbersome, have a huge volume, complicated design are difficult to maintain. Furthermore, such an full-electric carrier needs to be operated by a professional operator, further increasing the operational difficulty.

To provide comparable handling capacity as traditional hand hydraulic carriers, the present invention provides a walking-type electric carrier having extremely-reduced volume and turning radius, which can be conveniently used in a narrow passage or in a container.

SUMMARY OF THE INVENTION

The purpose of the present invention is to solve the shortcomings in the prior art and provide a walking-type electric carrier, which has a stronger driving force than traditional hand hydraulic carriers, and can be more conveniently maintained than traditional full-electric carriers.

To achieve the above purpose, the present invention adopts the following technical solution:

A walking-type electric carrier, which comprises a handlebar, a driving mechanism and a carrier frame that is connected to the driving mechanism; the handlebar comprises an armrest crossbar and a vertical post that is vertically connected to the armrest crossbar; the vertical post is connected to the driving mechanism, and is provided with a lifting handle; the armrest crossbar is provided with a detachable handle component, which comprises a handle base and a handle body; the handle base is detachably connected to the handle body; the driving mechanism is controlled by the handle body to propel the carrier to move.

In another preferred embodiment, the handle base comprises a vertical abutment plate. The upper portion of the abutment plate is connected to an upper left side plate and an upper right side plate that are perpendicular to the abutment plate. The lower portion of the abutment plate is connected to a lower left side plate and a lower right side plate that are perpendicular to the abutment plate. A space is formed between the lower left side plate and the upper left side plate, thereby forming a mounting port for the left armrest portion. Similarly, a space is formed between the lower right side plate and the upper right side plate, thereby forming a mounting port for the right armrest portion. The lower right side plate is provided with a notch, and the lifting handle protrudes through the notch. The armrest crossbar is simultaneously embedded into the left armrest mounting port and the right armrest mounting port. The vertical post is embedded between the lower left side plate and the lower right side plate. The handle body is detachably connected to the handle base. One portion of the handle body is embedded between the upper left side plate and the upper right side plate, and the other portion of the handle body is embedded into the lower left side plate and the lower right side plate. The two sides of the handle body are respectively fixed to the lower left side plate and the lower right side plate through screws.

In another preferred embodiment, the handle base is provided with two shock-proof sponge mats, and the reverse side of the handle body is provided with an upper sponge mat mounting slot and a lower sponge mat mounting slot. Each shock-proof sponge mat mounting slot is provided with a sponge mat.

In another preferred embodiment, the driving mechanism comprises a hydraulic apparatus, a bearing bridge and an electric driving apparatus. The hydraulic apparatus comprises a housing, and the bottom of the housing extends to form a pump casing. An oil cylinder is inserted in the pump casing. The vertical post and the housing of the hydraulic apparatus form a pinned connection. The electric driving apparatus comprises a fixing base, a speed-reducing motor and a driving wheel. The pump casing protrudes through the bearing bridge, and is fixed to the fixing base. The speed-reducing motor propels the driving wheel through a chain.

In another preferred embodiment, the carrier frame comprises a front carrier frame and a lower connecting rod unit. The lower connecting rod unit is connected to the bearing bridge. The front carrier frame comprises a carrier body. The bottom of the carrier body is connected to a pair of prongs. The carrier body is connected to the hydraulic apparatus.

In another preferred embodiment, the bearing bridge is provided with an intermediate plate and two side plates. The two side plates, which are respectively connected to the two sides of the intermediate plate, are bent downwards. The two side plates are respectively provided with a side plate through-hole. The intermediate plate is provided with a bearing hole, and a bearing is mounted therein. One side of the bearing hole is provided with an arc-shaped through-hole, and the two sides of the arc-shaped through-hole are respectively provided with two limiting holes, and a round pin is inserted into the limiting through-holes.

In another preferred embodiment, the two side plates of the bearing bridge are tightly held on the top of the fixing base. The top of the fixing base and the corresponding portion of the bearing hole are provided with a round through-hole, and the round through-hole is provided with an inner flattened surface. One side of the round through-hole is provided with a square-shaped cable through-hole. The pump casing is provided with an outer flattened surface. The outer flattened surface and the inner flattened surface can coordinate to fix each other.

In another preferred embodiment, a speed-reducing motor is fixed to the left side of the fixing base. The output shaft of the speed-reducing motor is inserted into the interior of the fixing base. An electromagnetic brake is fixed to the right side of the fixing base. The end portion of the output shaft of the speed-reducing motor is inserted into the inner hole of the electromagnetic brake. The end portion of the speed-reducing motor is provided with a first key slot, which coordinates with the brake pad disposed in the inner hole of the electromagnetic brake through a flat key. The central portion of the output shaft of the speed-reducing motor is provided with a second key slot, which is fixed to a small chain wheel through a flat key. The bottom of the fixing base is provided with a driving wheel fixing shaft, and a bearing is mounted on the driving wheel fixing shaft. A driving wheel is mounted on the bearing. A big chain wheel is fixed to the driving wheel through a bolt. The big chain wheel, the chain and the small chain wheel are combined to form a chain transmission. The driving wheel fixing shaft is fixed to the fixing base through a spring pin.

In another preferred embodiment, a rolling bearing is mounted on the fixing base, and the outer ring of the rolling bearing is fixed to the fixing base. The inner ring of the rolling bearing is fixed to the output shaft of the speed-reducing motor.

In another preferred embodiment, the center distance between the big chain wheel and the small chain wheel is equal to the sum of the diameter of the big chain wheel and that of the small chain wheel.

In another preferred embodiment, the lower connecting rod unit comprises a pair of lower connecting rods, a pair of long connecting rods and a pair of bearing wheel structures. The lower connecting rod is provided with a front pin shaft through-hole, an intermediate connecting rod through-hole and a rear pin shaft through-hole. The pin shaft protrudes through the front pin shaft through-hole and the side plate through-hole to form a pinned connection. The two lower connecting rods are respectively fixed to the two ends of the connecting rod. The connecting rod protrudes through the intermediate connecting rod through-hole of the lower connecting rod. A long supporting shaft is mounted in the connecting rod. The long supporting shaft is connected to the front carrier frame, and the rear pin shaft through-hole of the lower connecting rod forms a pinned connection with a short pin shaft and one end of a long connecting rod mounting base. The other end of the long connecting rod mounting base and one end of the long connecting rod form a threaded connection through a hexagon nut. The other end of the long connecting rod and the bearing wheel structure form a shaft connection through a long connecting rod mounting shaft.

In another preferred embodiment, the front carrier frame is provided with a pair of prongs and a carrier body that is fixed to the prongs. The long connecting rod and the bearing wheel structure are mounted on the reverse side of the prong. The lower connecting rod of the lower connecting rod unit protrudes through the through-hole of the prong. The two ends of the long supporting shaft mounted in the connecting rod, which are used to fix the two lower connecting rods, are respectively rotationally connected to the two lower connecting rod fixing bases of the carrier body.

In another preferred embodiment, the carrier body comprises two body plates, a panel and a top cover, wherein the two body plates are jointed to form a cone-shaped configuration through the panel. The top cover is fixed above the body plates. The top cover and the oil cylinder are connected through a steel ball. The top cover is provided with a battery box through-hole. A battery box supporting stand is fixed to the lower side of the battery box through-hole.

In another preferred embodiment, a pluggable battery box is mounted on the battery box supporting stand of the carrier body. An emergency stop switch is mounted on the top cover near the handlebar. A controller is mounted on the front side of the fixing base, and the fixing base is provided with a plurality of cable through-holes. The controller is separately connected to the speed-reducing motor and the electromagnetic brake through flexible cables. A buzzer is mounted on one side of the electromagnetic brake of the fixing base.

Compared with the prior art, the present invention has the following advantages:

The electric carrier of the present invention is equipped with an electric driving apparatus, which is more powerful than traditional hand hydraulic carriers, enabling the operator to easily pull the carrier. Additionally, the present invention adopts the combination of the chain wheel and the chain, which is more practical than using a gear. The speed-reducing motor, the electromagnetic brake and the controller supporting stand are mounted underneath the bearing bridge, and the battery box is mounted on the carrier, making the integral structure more compact. Furthermore, the handle component for controlling the driving mechanism can be detached from the handlebar, and the handle component is detachable, allowing the handle component to be conveniently maintained. The handle component of the present invention is universal, thereby realizing the modularization and decreasing the cost.

BRIEF DESCRIPTION OF THE DRAWINGS

To clearly expound the present invention or technical solution, the drawings and embodiments are hereinafter combined to illustrate the present invention. Obviously, the drawings are merely some embodiments of the present invention and those skilled in the art can associate themselves with other drawings without paying creative labor.

DETAILED DESCRIPTION OF THE INVENTION

Figure 1:
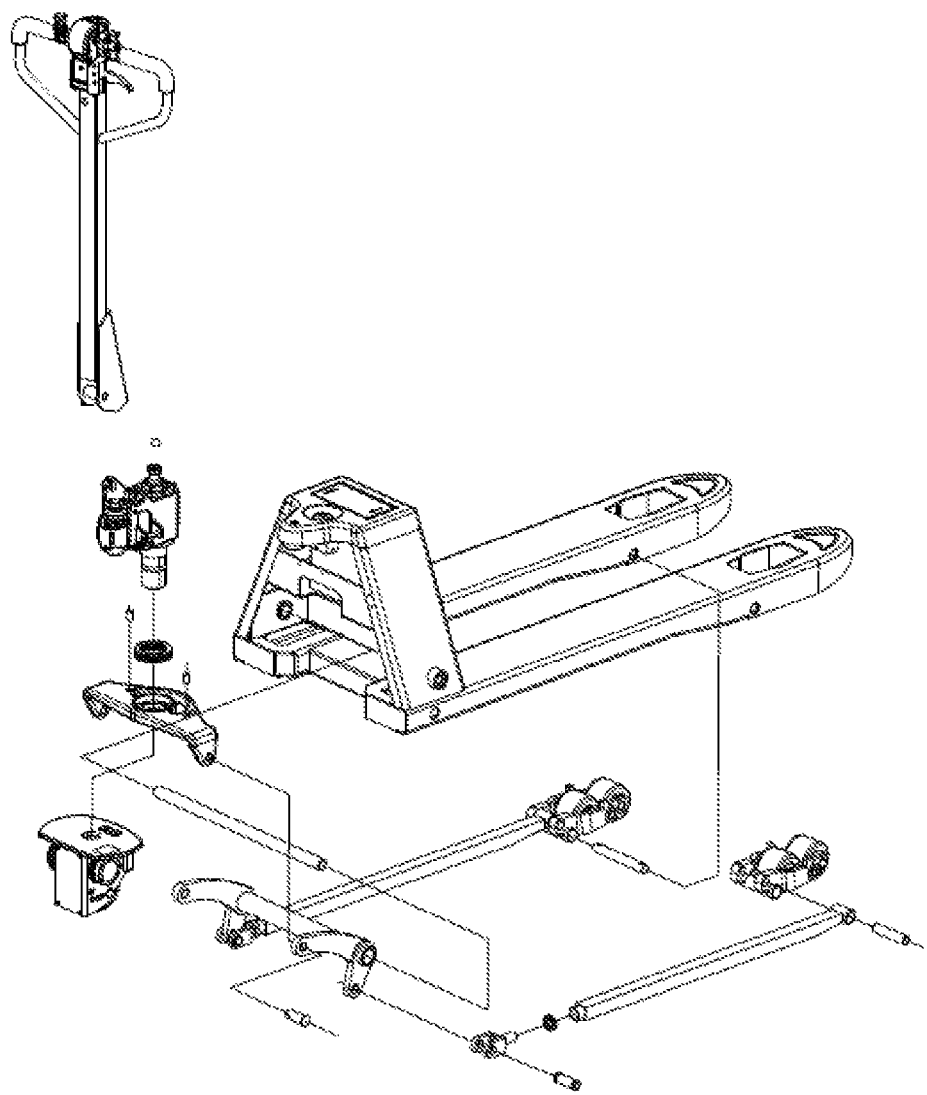
FIG. 1 is an exploded view of the present invention.
Figure 2:
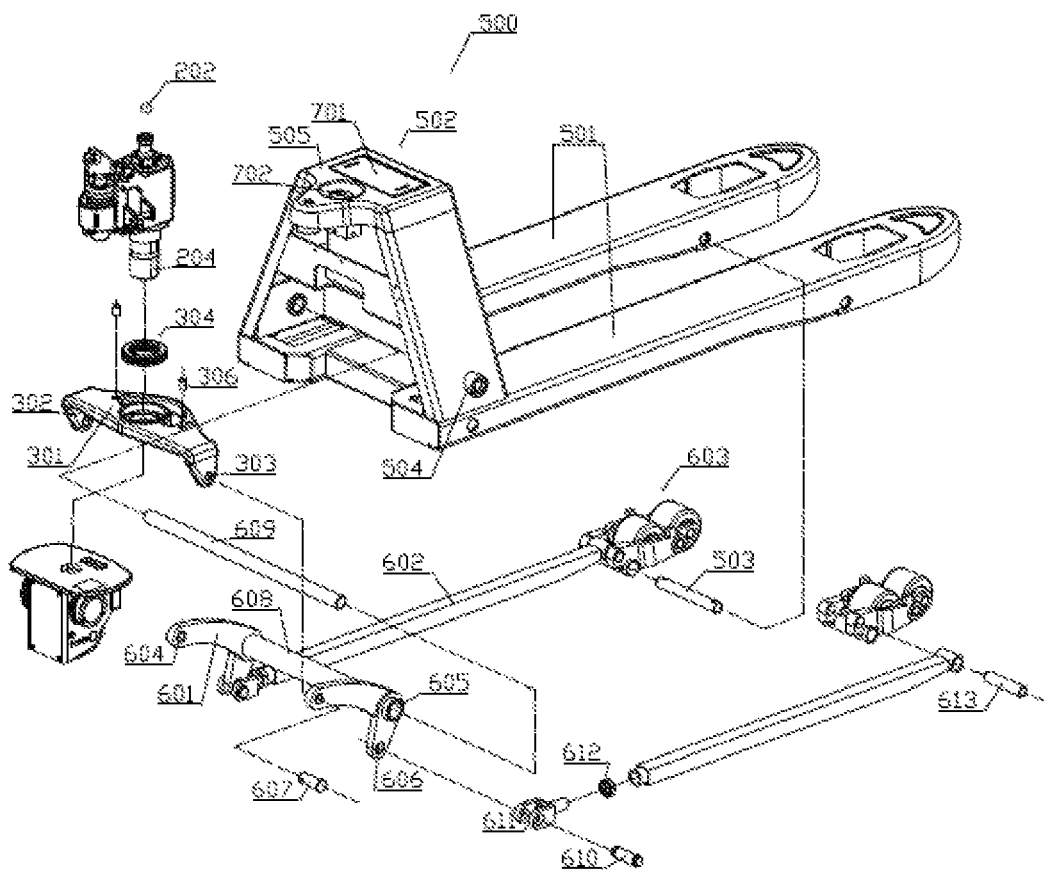
FIG. 2 is an exploded view illustrating a partial structure of the present invention.
Figure 3:
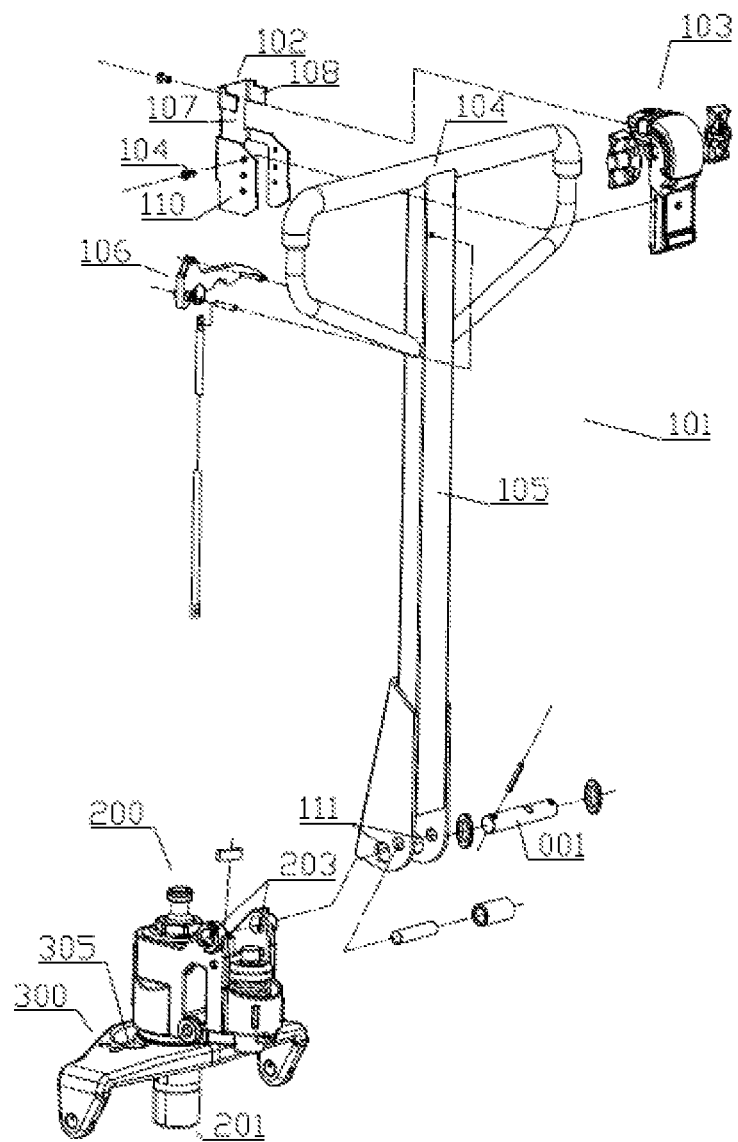
FIG. 3 is an exploded view illustrating a partial structure of the present invention.
Figure 4:
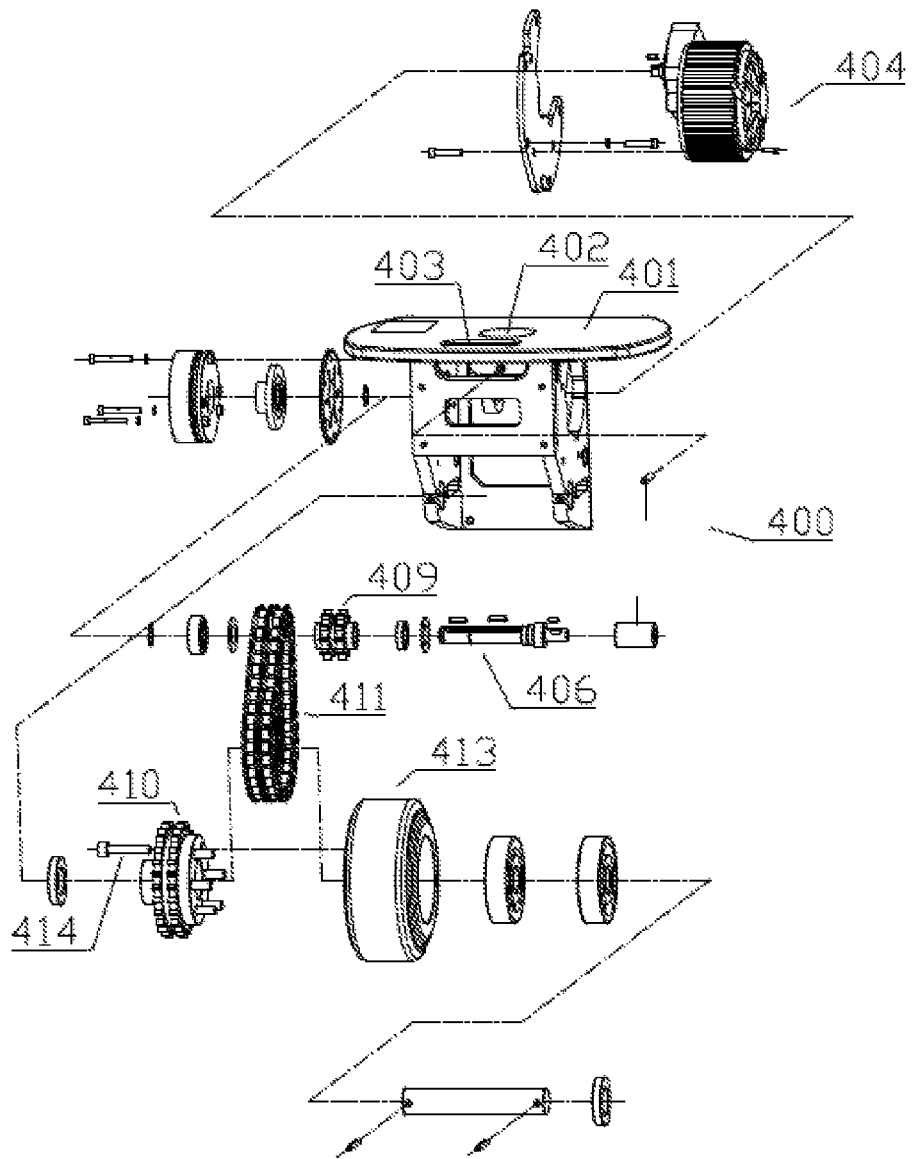
FIG. 4 is an exploded view of the electric driving apparatus of the present invention.
Figure 5:
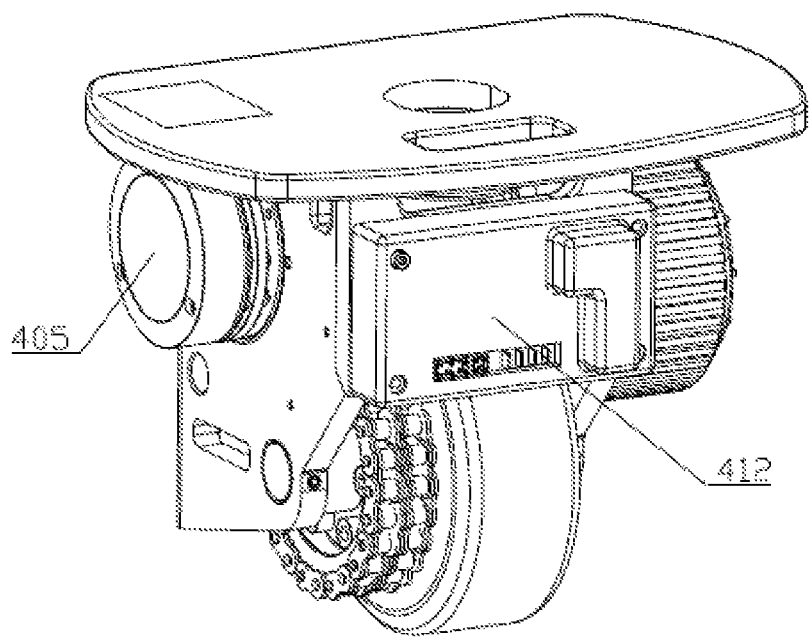
FIG. 5 is a structural diagram of the electric driving apparatus of the present invention.
Figure 6:
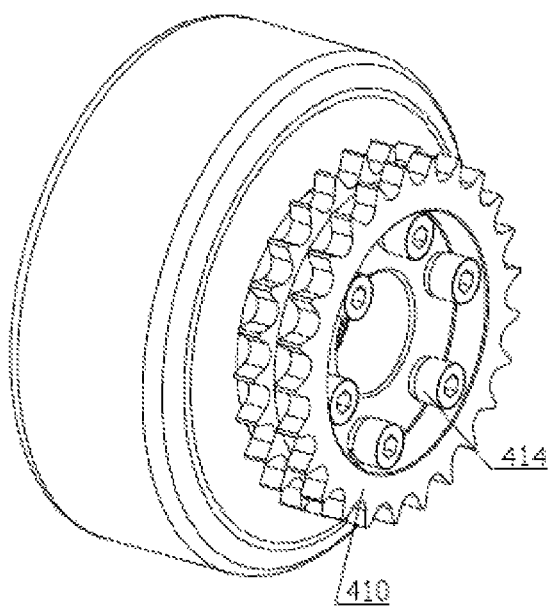
FIG. 6 is a schematic diagram illustrating a partial structure in FIG. 5 of the present invention.
Figure 7:
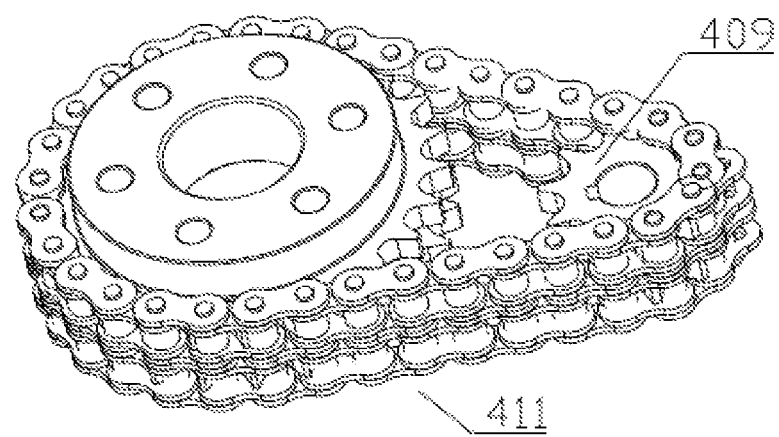
FIG. 7 is a schematic diagram illustrating a partial structure in FIG. 5 of the present invention.
Figure 8:
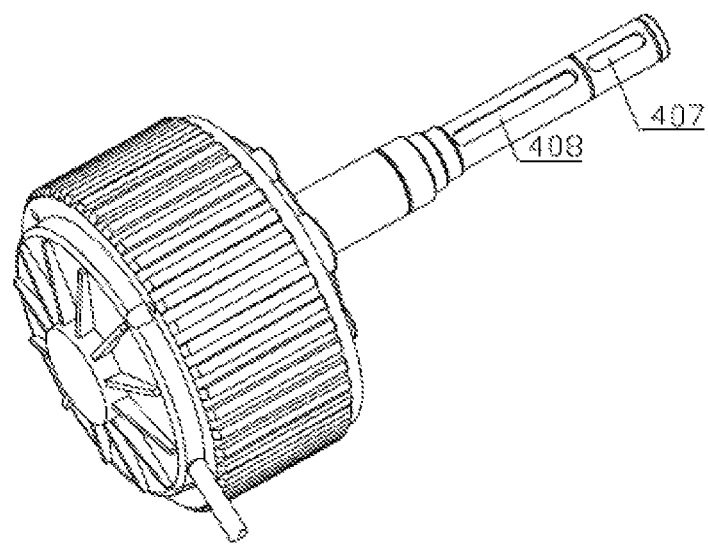
FIG. 8 is a schematic diagram illustrating a partial structure in FIG. 5 of the present invention.
Figure 9:
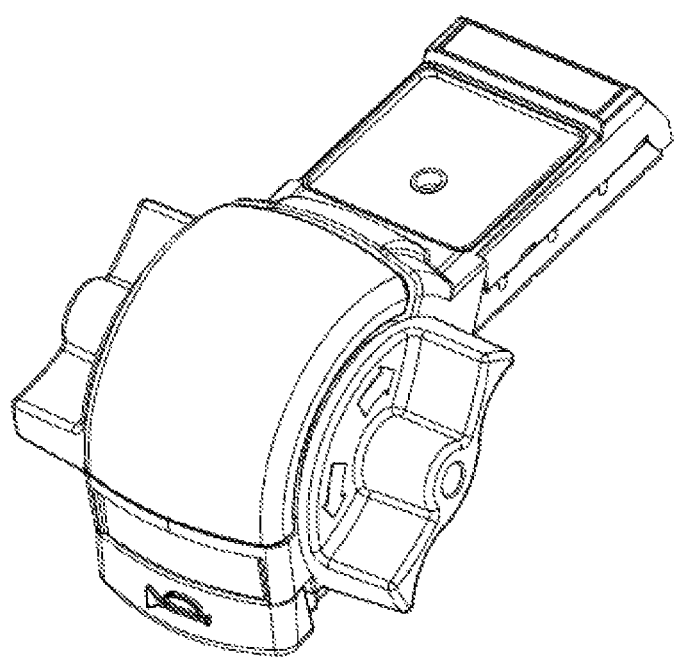
FIG. 9 is a structural diagram of the handle component of the present invention.
Figure 10:
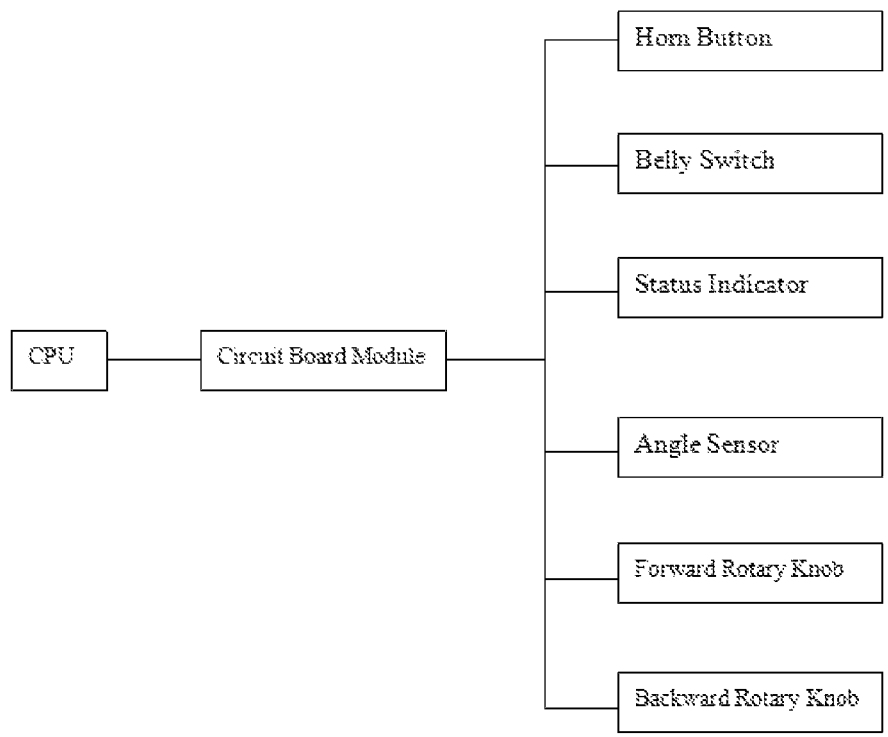
FIG. 10 is a schematic diagram illustrating a partial circuit structure of the present invention.

Drawings and detailed embodiments are combined hereinafter to elaborate the technical principles of the present invention.

The terms "upper", "lower", "top", "bottom", "internal", "external" and similar ones used below do not imply a required limitation in all embodiments of the present invention, but are used herein to describe relative direction or orientation in exemplary embodiments illustrated in the figures.

Furthermore, the terms "first" and "second" are merely used for descriptive purpose, which should neither be seen as an indication or implication of a relative importance, nor be seen as that of the quantity of the technical features.

The present invention provides a walking-type electric carrier, which comprises a handlebar 101, a driving mechanism and a carrier frame that is connected to the driving mechanism. The handlebar 101 comprises an armrest crossbar 104 and a vertical post 105 that is vertically connected to the armrest crossbar 104. The vertical post is connected to the driving mechanism, and is provided with a lifting handle 106. The armrest crossbar is provided with a detachable handle component, which comprises a handle base 102 and a handle body 103. The handle base is detachably connected to the handle body. The driving mechanism is controlled by the handle body to propel the carrier to move.

The handle base comprises a vertical abutment plate 107, which is connected to an upper left side plate and an upper right side plate 108 that are perpendicular to the abutment plate. The lower portion of the abutment plate is connected to a lower left side plate 110 and a lower right side plate that are perpendicular to the abutment plate. A space is formed between the lower left side plate and the upper left side plate, thereby forming a mounting port for the left armrest portion. Similarly, a space is formed between the lower right side plate and the upper right side plate, thereby forming a mounting port for the right armrest portion. The lower right side plate is provided with a notch, and the lifting handle protrudes through the notch.

The armrest crossbar is simultaneously embedded into the left armrest mounting port and the right armrest mounting port. The vertical post is embedded between the lower left side plate and the lower right side plate. The handle body is detachably connected to the handle base. One portion of the handle body is embedded between the upper left side plate and the upper right side plate, and the other portion of the handle body is embedded into the lower left side plate and the lower right side plate. The two sides of the handle body are respectively fixed to the lower left side plate and the lower right side plate through screws 114. In addition to being fixed via screws, the handle body can be engaged with the lower left side plate and the lower right side plate.

The handle base is provided with two shock-proof sponge mats, and the reverse side of the handle body is provided with an upper sponge mat mounting slot and a lower sponge mat mounting slot. Each shock-proof sponge mat mounting slot is provided with a sponge mat for ensuring the holding durability and reliability. A central processing unit (CPU) is disposed in the handle body.

Compared with the traditional carriers requiring a customized and specialized handle head and handlebar, the present invention coordinates the handle base with the handle body, thereby enabling them to fit various carrier handlebars. Consequently, the universalization and modularization of the handle base and the handlebar can be achieved.

The driving mechanism comprises a hydraulic apparatus 200, a bearing bridge and an electric driving apparatus. The bottom of the handlebar is provided with two vertical post through-holes 111. The hydraulic apparatus comprises a housing, and the bottom of the housing extends to form a pump casing. An oil cylinder is disposed in the pump casing. The housing of the hydraulic apparatus is provided with two housing through-holes 203. A handle pin shaft 001 protrudes through the handle through-hole and the housing through-hole, thereby forming a pinned connection.

The bearing bridge 300 is provided with an intermediate plate 301 and two side plates 302. The intermediate plate and the two side plates are molded in one body. The two side plates, which are respectively connected to the two sides of the intermediate plate, are downwardly bent. The two side plates are respectively provided with a side plate through-hole 303 having a diameter of 18 mm. The two side plate through-holes are used to connect the lower connecting rod 600. The two side plates are tightly held and fixed on the top of the electric driving mechanism 400.

The intermediate plate is provided with a bearing hole, and a bearing 304 is mounted therein. When installing the bearing, the pump casing 201 of the hydraulic apparatus protrudes through the bearing. At this moment, the housing bottom surface of the hydraulic apparatus becomes in contact with the upper surface of the intermediate plate. During the rotating process, the thickness of the bearing is designed to be slightly greater than the depth of the bearing hole, thereby avoiding the carrier from being quickly worn due to the abrasion between the bearing bridge and the hydraulic apparatus. Consequently, once the hydraulic apparatus is connected to the bearing bridge, the housing bottom surface of the hydraulic apparatus touches the upper surface of the bearing, avoiding abrasion while enabling the hydraulic apparatus to rotate.

One side of the bearing hole on the bearing bridge is provided with an arc-shaped through-hole 305, and a cable line protrudes through the arc-shaped through-hole. When the carrier turns, the cable line can freely move within the arc-shaped through-hole along the movement of the carrier, thereby preventing the cable line from being twisted or broken. Thus, the cable line can be effectively protected. Compared with the traditional cable line having a long length, the cable line of the present invention has a more compact design. The two sides of the arc-shaped through-hole are respectively provided with two limiting holes. Once a cylindrical pin 306 is inserted into the four limiting holes, the turning angle of the hydraulic apparatus can be precisely limited.

The electric driving apparatus comprises a fixing base 401. The two side plates of the bearing bridge are tightly held on the top of the fixing base. The top of the fixing base and the corresponding portion of the bearing hole are provided with a round through-hole 402, and the round through-hole is provided with an inner flattened surface. One side of the round through-hole is provided with a square-shaped cable through-hole 403, and the cable line can protrude through the square-shaped through-hole.

A speed-reducing motor 404 is fixed to the left side of the fixing base. The output shaft of the speed-reducing motor is inserted into the interior of the fixing base. An electromagnetic brake 405 is fixed to the right side of the fixing base. The end portion of the output shaft 406 of the speed-reducing motor is inserted into the inner hole of the electromagnetic brake. The end portion of the speed-reducing motor is provided with a first key slot 407, which coordinates with the brake pad disposed in the inner hole of the electromagnetic brake through a flat key. The central portion of the output shaft of the speed-reducing motor is provided with a second key slot 408, which is fixed to a small chain wheel 409 through a flat key. The bottom of the fixing base is provided with a driving wheel fixing shaft, and a bearing is mounted on the driving wheel fixing shaft. A driving wheel 413 is mounted on the bearing. A big chain wheel 410 is fixed to the driving wheel through a bolt 414. The big chain wheel, the chain 411 and the small chain wheel are combined to form a chain transmission. A controller 412 is mounted on the front side of the fixing base. The fixing base is provided with a plurality of cable through-holes. The controller is separately connected to the speed-reducing motor and the electromagnetic brake through flexible cables.

The driving wheel fixing shaft is connected to the fixing base through a spring pin. A rolling bearing is mounted on the fixing base, and the outer ring of the rolling bearing is fixed to the fixing base. The inner ring of the rolling bearing is fixed to the output shaft of the speed-reducing motor. The center distance between the big chain wheel and the small chain wheel is equal to the sum of the diameter of the big chain wheel and that of the small chain wheel.

The housing is provided with two housing through-holes, and the bottom of the handlebar is provided with two vertical post through-holes. The two vertical post through-holes are disposed between the two housing through-holes. When the handle pin shaft protrudes through the handlebar through-hole and the housing through-hole, the handlebar and the housing are combined to form a pinned connection. Subsequently, the handlebar is downwardly turned, and the spring of the hydraulic apparatus is pressed by the shaft sleeve of the bottom of the handlebar, thereby lifting the oil cylinder.

The pump casing of the hydraulic apparatus is provided with an outer flattened surface 204. The pump casing protrudes through the bearing of the intermediate plate, and is fixed therein. The outer flattened surface of the pump casing is fixed to the inner flattened surface of the round through-hole on the fixing base. When the carrier needs to be turned, the operator can turn the handlebar of the carrier to propel the hydraulic apparatus to rotate. Subsequently, the fixing base is propelled to turn with the hydraulic apparatus, further propelling the driving wheel to turn together.

The lower connecting rod unit comprises a pair of lower connecting rods 601, a pair of long connecting rods 602 and a pair of bearing wheel structures 603. The lower connecting rod is provided with a front pin shaft through-hole 604, an intermediate connecting rod through-hole 605 and a rear pin shaft through-hole 606. The pin shaft 607 protrudes through the front pin shaft through-hole and the side plate through-hole to form a pinned connection. The connecting rod 608 protrudes through the intermediate connecting rod through-holes of the two lower connecting rods, and is fixed therein. The two lower connecting rods are respectively fixed to the two ends of the connecting rod. A long supporting shaft 609 is mounted on the connecting rod. The length of the long supporting shaft is slightly greater than that of the connecting rod. The long supporting shaft is connected to the front carrier frame, and the rear pin shaft through-hole of the lower connecting rod forms a pinned connection with a short pin shaft 610 and one end of a long connecting rod mounting base 611. The other end of the long connecting rod mounting base and one end of the long connecting rod form a threaded connection through a hexagon nut 612. The other end of the long connecting rod and the bearing wheel structure form a shaft connection through a long connecting rod mounting shaft 613.

The front carrier frame 500 is provided with a pair of prongs 501 used for mounting the lower connecting rod, and a carrier body 502 that is fixed to the prongs. The two prongs are connected and fixed through a connecting plate. The lower connecting rod unit is mounted on the reverse side of the prong, and the bearing wheel structure of the lower connecting rod unit is fixed to one end of the prong through a wheel frame mounting shaft 503. The lower connecting rod of the lower connecting rod unit protrudes through the through-hole of the other end of the prong. The two ends of the long supporting shaft of the lower connecting rod unit are respectively rotationally connected to two lower connecting rod fixing bases 504 of the carrier body.

The carrier body comprises two body plates, which are connected through a panel. The two body plates and the panel are jointed to form a cone-shaped configuration. A top cover 505, which is connected to the two body plates, is provided with a battery box through-hole. The two body plates disposed at the lower side of the battery box are fixed to the battery box supporting stands. During use, the battery box is placed through the battery box through-hole, and is supported by the battery box supporting stands.

One side of the battery box through-hole of the top cover coordinates with a steel ball 202 disposed on the output shaft of the hydraulic apparatus oil cylinder, thereby forming a top pressing cooperation therewith. An emergency stop switch is mounted between the battery box through-hole of the top cover and the steel ball.

The control apparatus comprises a battery box 701, an emergency stop switch 702, a controller 703 and a buzzer 704. The battery box is mounted on the carrier body of the front carrier frame. The battery box is a rechargeable and pluggable battery, which can be conveniently mounted and replaced. The emergency stop switch is mounted on one side of the top cover of the front carrier frame near the operating system, which can be conveniently operated by the operator. The controller is mounted on the fixing base of the electric driving apparatus. The controller and the speed-reducing motor move together, thus reducing wear on the cable line and the loosening of the connecting component due to the frequent rotation and swing of the electric driving apparatus. Meanwhile, near one side of the front carrier frame, the outer cover of the controller is an aluminum housing, which can keep the controller clean and avoid short circuit to a certain degree. Furthermore, the structure of the present invention is more compact than traditional electric carriers. The buzzer is mounted on one side of the electromagnetic brake of the fixing base for alarming the operator.

The top of the handle body is provided with a horn button. The horn button disposed on the top allows the operator to tap with a single hand. A belly switch is mounted on the lower side of the horn button, and a forward rotary knob and a backward rotary knob are respectively mounted on the two sides of the belly switch.

The lower side of the belly switch is provided with a label attachment groove. A status indicator opening is provided in the label attachment groove, and a status indicator is mounted in the status indicator opening. The label attached in the label attachment groove is a description of the status indictor. The status indicator allows the operator to conveniently learn about the electric quantity of the carrier in real time. The status indicator adopts a three-color LED lamp. The variation of the electric quantity can be displayed by different colors of the LED lamp, which can intuitively and clearly display the status of the carrier.

A circuit board module is mounted in the handle body. The input end of the circuit board module is electrically connected to the central processing unit (CPU), and the output end of the circuit board module is separately electrically connected to the belly switch, the horn button and the status indicator. Furthermore, an angle sensor is mounted in the handle body, and the output end of the circuit board module is electrically connected to the angle sensor. The central processing unit (CPU) is electrically connected to the controller, the battery box, the buzzer and the emergency stop switch of the fixing base. The angle sensor is used to monitor the angle of the handlebar in real time. When the handlebar is positioned in an effective working angle, the angle sensor transmits signal to the central processing unit (CPU), and the central processing unit (CPU) can send signal to the controller of the carrier, thereby enabling the carrier to move smoothly. Once the handlebar is not positioned in an effective working angle, the carrier cannot be moved.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A walking-type electric carrier, comprising:
   a handlebar,
   a hydraulic apparatus,
   a bearing bridge,
   an electric driving apparatus,
   a front carrier frame, and
   a lower connecting rod unit, wherein the front carrier frame and the bearing bridge are movably connected through the lower connecting rod unit, wherein the hydraulic apparatus protrudes through the bearing bridge, and is fixed to the electric driving apparatus, wherein the hydraulic apparatus and the handlebar are movably connected, wherein the front carrier frame comprises a carrier body and a prong, and a battery box is mounted on the carrier body, wherein the electric driving apparatus comprises a fixing base, and a driving wheel is mounted underneath the fixing base, wherein a speed-reducing motor, an electromagnetic brake and a controller used for controlling the speed-reducing motor and the electromagnetic brake are mounted on one side of the fixing base.

2. The walking-type electric carrier of claim 1, wherein the handlebar comprises an armrest crossbar and a vertical post that is vertically connected to the armrest crossbar, wherein the vertical post is connected to the driving mechanism, and is provided with a lifting handle, wherein the armrest crossbar is provided with a detachable handle component, which comprises a handle base and a handle body, wherein the handle base is detachably connected to the handle body, wherein the driving mechanism is controlled by the handle body to propel the carrier to move.

3. The walking-type electric carrier of claim 2, wherein the handle base comprises a vertical abutment plate, which is connected to an upper left side plate and an upper right side plate that are perpendicular to the abutment plate, wherein the lower portion of the abutment plate is connected to a lower left side plate and a lower right side plate that are perpendicular to the abutment plate, wherein a space is formed between the lower left side plate and the upper left side plate, thereby forming a mounting port for the left armrest portion, wherein a space is formed between the lower right side plate and the upper right side plate, thereby forming a mounting port for the right armrest portion, wherein the lower right side plate is provided with a notch, and the lifting handle protrudes through the notch, wherein the armrest crossbar is simultaneously embedded into the left armrest mounting port and the right armrest mounting port, wherein the vertical post is embedded between the lower left side plate and the lower right side plate, wherein the handle body is detachably connected to the handle base, wherein one portion of the handle body is embedded between the upper left side plate and the upper right side plate, and the other portion of the handle body is embedded into the lower left side plate and the lower right side plate, wherein the two sides of the handle body are respectively fixed to the lower left side plate and the lower right side plate through screws.

4. The walking-type electric carrier of claim 1, wherein the hydraulic apparatus comprises a housing, and the bottom of the housing extends to form a pump casing, wherein an oil cylinder is inserted into the pump casing, wherein the vertical post and the housing of the hydraulic apparatus are combined to form a pinned connection, wherein the pump casing protrudes through the bearing bridge, and is fixed to the fixing base, wherein the driving wheel is propelled by the speed-reducing motor through a chain, wherein the lower connecting rod unit is connected to the bearing bridge, wherein the front carrier frame comprises a carrier body, wherein the bottom of the carrier body is connected to a pair of prongs, wherein the carrier body is connected to the hydraulic apparatus.

5. The walking-type electric carrier of claim 4, wherein the bearing bridge is provided with an intermediate plate and two side plates, wherein the two side plates, which are respectively connected to the two sides of the intermediate plate, are downwardly bent, wherein the two side plates are respectively provided with a side plate through-hole, wherein the intermediate plate is provided with a bearing hole, and a bearing is mounted therein, wherein one side of the bearing hole is provided with an arc-shaped through-hole, and the two sides of the arc-shaped through-hole are respectively provided with two limiting holes, and a round pin is inserted into the limiting through-holes.

6. The walking-type electric carrier of claim 5, wherein the two side plates of the bearing bridge are tightly held on the top of the fixing base, wherein the top of the fixing base and the corresponding portion of the bearing hole are provided with a round through-hole, and the round through-hole is provided with an inner flattened surface, wherein one side of the round through-hole is provided with a square-shaped cable through-hole, wherein the pump casing is provided with an outer flattened surface, wherein the outer flattened surface and the inner flattened surface can coordinate to fix each other.

7. The walking-type electric carrier of claim 1, wherein a speed-reducing motor is fixed to the left side of the fixing base, wherein the output shaft of the speed-reducing motor is inserted into the interior of the fixing base, wherein an electromagnetic brake is fixed to the right side of the fixing base, wherein the end portion of the output shaft of the speed-reducing motor is inserted into the inner hole of the electromagnetic brake, wherein the end portion of the speed-reducing motor is provided with a first key slot, which coordinates with the brake pad disposed in the inner hole of the electromagnetic brake through a flat key, wherein the central portion of the output shaft of the speed-reducing motor is provided with a second key slot, which is fixed to a small chain wheel through a flat key, wherein the bottom of the fixing base is provided with a driving wheel fixing shaft, and a bearing is mounted on the driving wheel fixing shaft, wherein a driving wheel is mounted on the bearing, wherein a big chain wheel is fixed to the driving wheel through a bolt, wherein the big chain wheel, the chain and the small chain wheel are combined to form a chain transmission, wherein the driving wheel fixing shaft is connected to the fixing base through a spring pin, wherein a controller is mounted on the front side of the fixing base, wherein the fixing base is provided with a plurality of cable through-holes, wherein the controller is separately connected to the speed-reducing motor and the electromagnetic brake through flexible cables, wherein a buzzer is mounted on one side of the electromagnetic brake of the fixing base.

8. The walking-type electric carrier of claim 4, wherein the lower connecting rod unit comprises a pair of lower connecting rods, a pair of long connecting rods and a pair of bearing wheel structures, wherein the lower connecting rod is provided with a front pin shaft through-hole, an intermediate connecting rod through-hole and a rear pin shaft through-hole, wherein the front pin shaft through-hole of the lower connecting rod, the pin shaft, and the side plate through-hole on the bearing bridge plate are combined to form a pinned connection, wherein the two lower connecting rods are respectively fixed to the two ends of the connecting rod, wherein the connecting rod protrudes through the intermediate connecting rod through-holes, wherein a long supporting shaft is mounted in the connecting rod, and the rear pin shaft through-hole of the lower connecting rod forms a pinned connection with a short pin shaft and one end of a long connecting rod mounting base, wherein the other end of the long connecting rod mounting base and one end of the long connecting rod form a threaded connection through a hexagon nut, wherein the other end of the long connecting rod and the bearing wheel structure form a shaft connection through a long connecting rod mounting shaft.

9. The walking-type electric carrier of claim 4, wherein the front carrier frame is provided with a pair of prongs and a carrier body that is fixed to the prongs, wherein the long connecting rod and the bearing wheel structure are mounted on the reverse side of the prong, wherein the lower connecting rod of the lower connecting rod unit protrudes through the through-hole of the prong, wherein the two ends of the long supporting shaft mounted in the connecting rod, which are used to fix the two lower connecting rods, are respectively rotationally connected to the two lower connecting rod fixing bases of the carrier body.

10. The walking-type electric carrier of claim 9, wherein the carrier body comprises two body plates, a panel and a top cover, wherein the two body plates are jointed to form a cone-shaped configuration through the panel, wherein the top cover is fixed above the body plates, wherein the top cover and the oil cylinder are connected through a steel ball, wherein the top cover is provided with a battery box through-hole, wherein a battery box supporting stand is fixed to the lower side of the battery box through-hole, wherein a pluggable battery box is mounted on the battery box supporting stand of the carrier body.

* * * * *